United States Patent [19]

Moore

[11] Patent Number: 5,028,383
[45] Date of Patent: Jul. 2, 1991

[54] NUCLEAR REACTOR STEAM DEPRESSURIZATION VALVE

[75] Inventor: Gary L. Moore, San Jose, Calif.

[73] Assignee: General Electric Company, San Jose, Calif.

[21] Appl. No.: 509,456

[22] Filed: Apr. 16, 1990

[51] Int. Cl.⁵ .............................................. G21C 9/00
[52] U.S. Cl. .................................. 376/277; 251/61.2; 251/63.5
[58] Field of Search ............... 376/277, 283; 251/61.2, 251/63.5

[56] References Cited

U.S. PATENT DOCUMENTS

| | | | |
|---|---|---|---|
| 3,451,423 | 6/1969 | Priese | 251/63.5 |
| 4,060,453 | 11/1977 | Schabert et al. | 376/277 |
| 4,238,290 | 12/1980 | Schabert et al. | 376/277 |
| 4,284,098 | 8/1981 | Kruschik | 251/61.2 |
| 4,615,354 | 10/1986 | Bianchi | 251/63.5 |

*Primary Examiner*—Daniel D. Wasil
*Attorney, Agent, or Firm*—R. R. Schroeder

[57] ABSTRACT

A fluid pressure actuated steam depressurization valve for nuclear reactor service. The valve is maintained closed retaining steam pressure within the system by the application of fluid pressure from an external source and control, and upon release of the applied fluid pressure steam pressure within the nuclear reactor system is vented to depressurize the system.

10 Claims, 2 Drawing Sheets

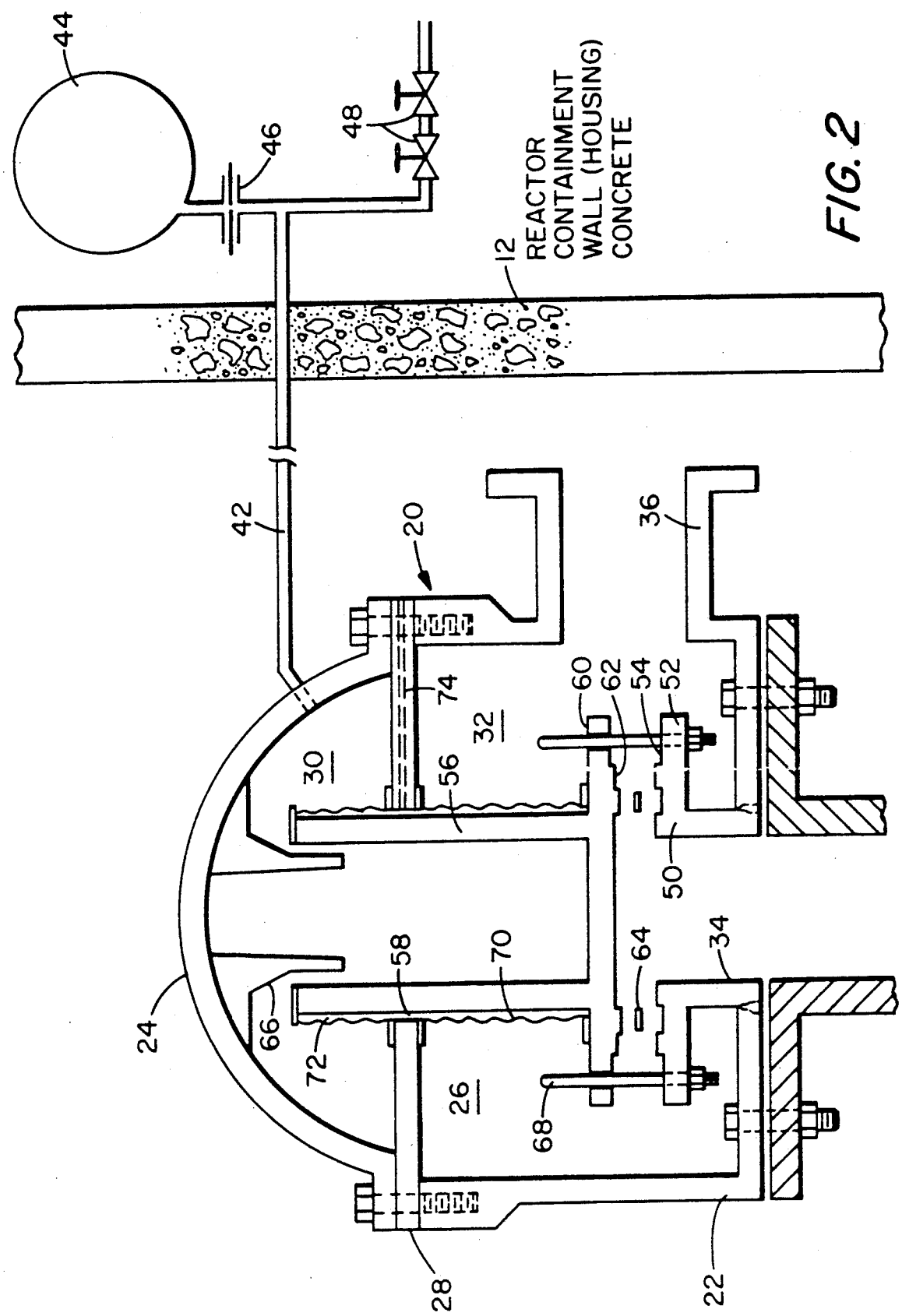

NUCLEAR REACTOR STEAM DEPRESSURIZATION VALVE

FIELD OF THE INVENTION

This invention relates to power generating nuclear fission reactor plants and equipment therefor. The invention is particularly concerned with an improvement in means used for depressurizing steam within the nuclear reactor pressurized system of a power generating plant.

Water cooled nuclear fission reactors utilized for electrical power generation, as with any steam producing boiler, require valve means to reduce excessively high pressures within the system, through venting, to maintain and insure system integrity and safety. Safety or relief, and combination safety-relief valves commonly used in many nuclear reactor plants, typically open at a specified pressure and reclose after the pressure of the system is reduced to a prescribed safe level. Anticipated nuclear reactor plant designs contemplate the use of "depressurization valves" to reduce excessively high pressures. Once opened, such valves have the unique feature of remaining open down to zero pressure without any further operator action and without need to provide power to maintain a valve in open position. Typically, the nature of the steam producing unit will determine the type and requirements for such depressurizing safety relief valves. This is especially so in the nuclear reactor field due to the distinctive conditions encountered with nuclear fission and the stringent safety requirements imposed in this industry, among other reasons.

BACKGROUND OF THE INVENTION

A unique aspect of nuclear reactors and a foremost safety consideration, is the inherent presence of radiation and radioactive materials. This highly significant condition requires the most strict design and safety conditions with respect to many components and functions of a nuclear reactor plant and imposes numerous requirements in operating and maintaining nuclear plants. For example, reactor components and related equipment which become significantly radioactive in service generally must be capable of long term, trouble free and positive functions, as well as being amenable to operation and maintenance by personnel in remote locations.

Steam depressurization and/or pressure relief valves or means are especially critical devices in any type of high pressure hot water and/or steam producing units, and when employed in a nuclear reactor plant the standards and demands must be applied to design and fabrication of such valves.

Various valve designs and operating modes have been proposed and considered in an effort to meet the stringent demands for such steam depressurization and pressure relief valves. For example, one proposed category of depressurization valves has been explosive/propellant-activated valves. In theory this type of valve should comply with the required design properties. This type of valve is fast operating, and routine valve maintenance and replacement of consumed parts of an opened valve can be quickly performed. However, it appears that with such explosive/propellant-activated valves, there are significant concerns such as limits upon the effective life of the explosive material as a result of exposure to heat and radiation, and flow rates obtainable with the current designs.

SUMMARY OF THE INVENTION

This invention comprises an improved steam depressurization valve for service in power generating, water cooled nuclear fission reactor plants. The valve of this invention, which will meet the requirements for nuclear reactor service, is maintained in the normal operating closed position by fluid pressure which can be sourced and controlled from outside the reactor containment and thus beyond any source of radiation, and opens to permit depressurization venting by release of the externally applied and controlled fluid pressure.

OBJECTS OF THE INVENTION

It is a primary object of this invention to provide an improved steam depressurization valve suitable for service in a nuclear fission reactor plant.

It is also an object of this invention to provide a mechanically uncomplicated and reliable, light-weight and leak-tight valve for steam depressurization in a nuclear fission reactor plant.

It is a further object of this invention to provide a steam depressurization valve which utilizes a positive source of fluid pressure to maintain the valve in its normal operating closed position such that the valve can be opened to its pressure relieving position simply by terminating the positive fluid pressure force applied thereto.

It is a still further object of this invention to provide a steam depressurization valve for which the source of the actuating medium for opening the valve and the control of the opening medium can be located outside the reactor plant safety containment.

BRIEF DESCRIPTION OF THE DRAWINGS

FIG. 2 is an elevational view, partly in cross-section, illustrating the construction and mode of operation of a steam depressurization valve of this invention.

DETAILED DESCRIPTION OF THE INVENTION

Figure 1:
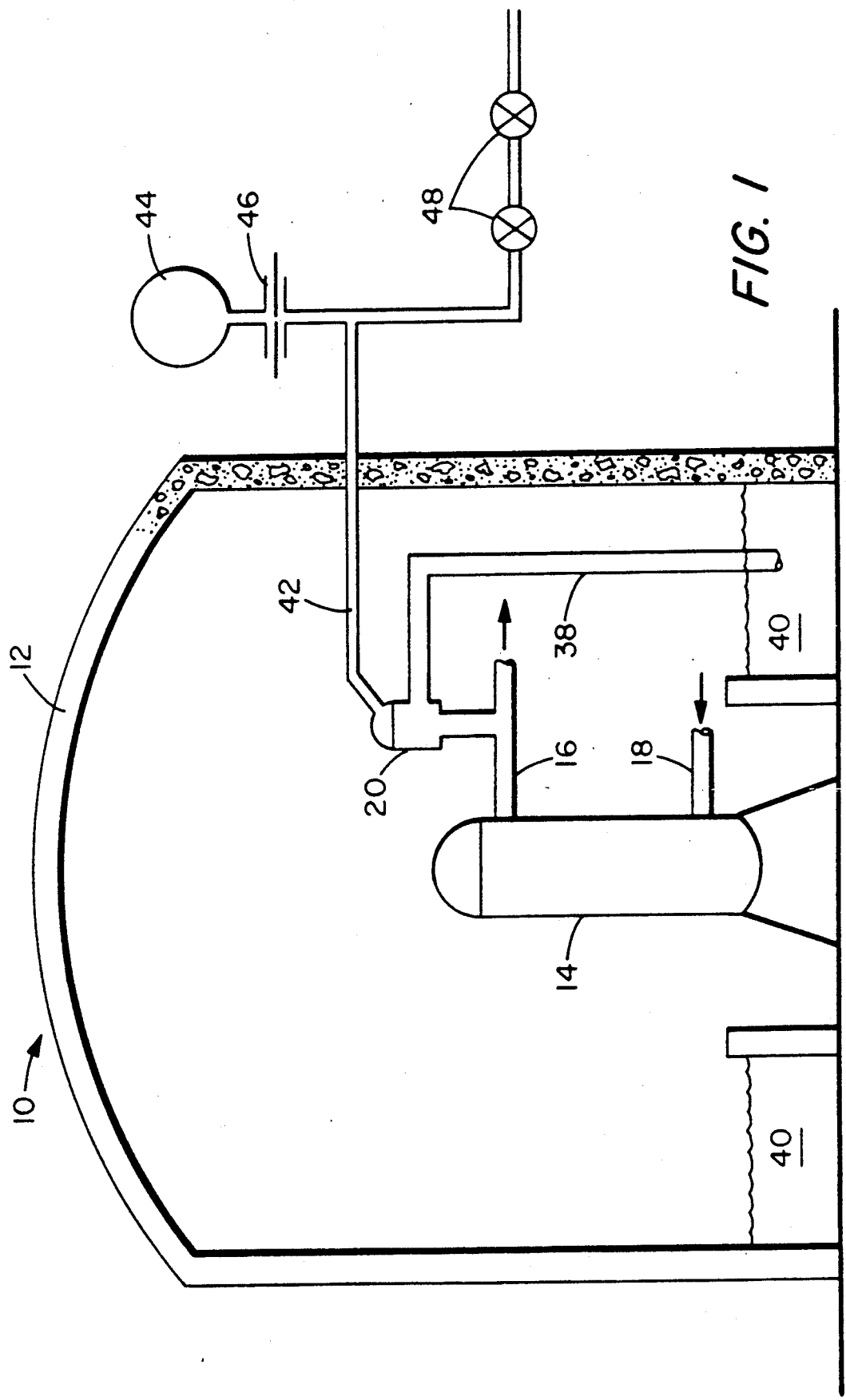
FIG. 1 is a schematic illustration of a nuclear fission reactor plant.

Referring to the drawings, in particular FIG. 1, a typical water cooled, steam producing nuclear fission reactor plant 10 comprises a containment structure 12 for enclosing and sealing in radiation and radioactive materials from the outer environment. Enclosed within the safety containment 12 is the reactor pressure vessel 14 containing the core of heat producing fissionable fuel and water coolant which comprises the source of steam for turbine operation. Steam pipe 16 conducts the generated steam to its location of use, such as a turbine, and condensate water return pipe 18 recycles the condensed steam back to the reactor as coolant water for reuse.

The steam depressurization valve 20 for depressurizing the steam from within the reactor system is arranged in fluid communication with the interior of the steam generating and containing components, including the pressure vessel 14 and the circuit comprising steam pipe 16 and condensate return pipe 18. For instance, the pressure relief valve 20 typically is located at a place within the system intermediate along the length of steam supply pipe 16 whereby it can be used to vent and depressurize all pressurized components of the coolant water/steam/condensate generating and circulating circuit.

Steam depressurization valve 20, as shown in detail in FIG. 2, comprises a valve body 22 having a removable cover 24 which together define a valve chamber 26. A partition plate 28, typically secured between the valve body 22 and cover 24, divides the valve chamber into a fluid pressure actuation compartment 30 and a steam flow control compartment 32. Valve body 22 is provided with an inlet connection 34 and outlet connection 36 for respectively connecting to a piping system inlet and outlet. The inlet 34 of the valve 20 is connected in fluid communication with the reactor pressurized system, such as steam pipe 16. Valve 20 outlet connection 36 is connected in fluid communication with a vent discharge pipe 38 which carries off pressurized steam and/or water to an apt disposal location such as a steam suppression pool 40 for cooling and condensing steam and/or hot water, thereby relieving pressure within the system.

Steam depressurization valve 20 is provided with a fluid duct 42 in fluid communication with its fluid pressure actuation compartment 30 and connected with a source of fluid pressure 44, such as a pressurized container of gas or liquid. Fluid duct 42 is preferably provided with a flow limiting orifice 46 to restrict the pressurized fluid flow from source 44 into the fluid pressure actuation compartment 30. Also, fluid duct 42 is provided with an exhaust system, depicted as exhaust valves 48, to reduce the valve actuation fluid pressure by venting the valve actuation fluid. These exhaust valves preferably have a greater flow area than the flow limiting orifice 46, and may be controlled manually or by system signal, and may be operated by any of several sources of energy.

Depressurization valve 20 contains a valve seat 50 mounted within the fluid flow control compartment 32. The other end of the cylindrical section of valve seat 50 includes or is machined into a radially projecting lateral flange 52 having a contoured extended valve seating surface 54.

Depressurization valve 20 additionally contains a valve sleeve or cylinder 56 which transverses the partition plate 28 and is reciprocally movable within orifice 58 in plate 28. The extent of reciprocal movement of valve cylinder 56 is mechanically restrained so as to retain one terminal end thereof extending into the fluid pressure activation compartment 30 and the other terminal end extending into the steam flow control compartment 32. Valve cylinder 56 is coaxially aligned with valve seat 50 which is mounted in the valve body 22 on the inlet piping connection in the fluid flow control compartment 32. The terminal end of valve cylinder 56 extending into the flow control compartment 32 is closed and can be provided with a radially projecting lateral flange 60 serving as a valve disk and having a contoured extended surface 62. The contoured surface 62 of the valve cylinder flange 60 is coaxially aligned and substantially conterminous with surface 54 of the valve seat flange 52 except for a controlled space for a flange gasket 64. Also the contoured flange surfaces 54 and 62 of the valve seat 50 and valve cylinder 56 face each other and the contours of their facing surfaces 54 and 62 are complementary whereby the two contoured surfaces can meet and adjoin in a matching relationship. The contoured surfaces 54 and 62 thus will meet and join to provide a fluid sealing interface therebetween.

One or more gaskets or sealing members 64 can be mounted on a contoured flange surface.

Reciprocatable valve cylinder 56 is preferably provided with mechanical guide means to inhibit lateral movement and to direct and align its reciprocal movement to and away from contact with the valve seat 50 so that the adjoining flange contoured surfaces 54 and 62 match. Guides 66 can be provided to restrain lateral movement of the end of the reciprocatable valve cylinder 56 within the fluid pressure actuation compartment 30. The guides 66 can be mounted on housing cover 24. A preferred embodiment for guides 66 comprises an outward and upward sloping portion, or bias for controlling the extent of the rise of the valve cylinder 56, and/or providing a frictional grip or hold on the valve cylinder 56 to fix the valve in open position. Pin type guides 68 secured in one flange (52–60) and extending through openings in the other coaxially aligned flange, as shown in FIG. 2, can be provided to restrain lateral movement of the other end of the reciprocatable valve cylinder 56 within the steam flow control compartment 32 and adjacent to the valve seat 50. Additional guides can be placed between the partition plate 28 and cylinder 56.

Valve cylinder 56 is preferably also provided with flexible bellows 70 and 72 to insure the sealing of the exterior of valve cylinder 56 from the contents of either the fluid pressure actuating compartment 30 or the fluid flow control compartment 32. Thus, fluid leakage between the fluid pressure actuating compartment 30 and fluid flow control compartment 32 is precluded. Moreover, the bellows can be designed to be sufficiently stiff to lift the valve cylinder 56 without any inlet steam pressure when the fluid pressure activation compartment 30 is depressurized, eliminating any need for springs to hold the valve open at low inlet steam pressure.

Preferably a leak-off means shown at 74 is provided in the valve 20, and provides means for indication of such leakage. The leak-off means comprises a small duct 74 such as passing through the partition plate 28 from the area between the valve cylinder 56 and bellows 70 or 72, and extending there from outside the valve housing 22. Thus any leakage from either the fluid pressure activation compartment 30 or the steam flow control compartment 32 through the bellows 70 or 72 will be evident from a discharge out through the leak-off duct 74. This duct 74 serves to prevent pressure buildup between the valve cylinder 56 and the enclosing bellows 70 and 72 resulting from entry of either steam or activation fluid pressure.

Operation of the steam depressurization valve 20 of this invention during periods of normal reactor performance simply comprises applying and maintaining fluid pressure to the fluid pressure activation compartment 30 of the valve 20 through fluid duct 42 from the fluid pressure source 44, which is preferably located and controlled from beyond the reactor plant 10 containment housing 12. This fluid pressure applied within the fluid pressure actuation compartment 30 forces and holds down the valve cylinder 56, pressing its flange sealing disk surface 62 into contact and flange closure with its counterpart, the valve seat flange sealing surface 54, thereby closing off valve inlet which is in fluid communication with the nuclear reactor pressure vessel and circulating system via steam pipe 16. Thus, during normal reactor performance, namely acceptable operating steam pressures, the steam depressurization valve 20 is retained in a closed position to maintain the pressurized circulation of heat generated steam and condensed water as energy transferring coolant through the reactor system.

However, upon the occurrence of any unacceptable degree of over-pressurization of the reactor circulating system, or to depressurize the system for various reasons such as controlling pressure fed leaks, automatic or manual means, which can be located in a safe area outside the reactor containment 12, activate the safety valve control 48 to terminate the fluid pressure applied to the fluid pressure activation compartment 30 of the valve 20 which was supplied through duct 42 from source 44. This operation can be as simple as opening a valve, such as valve 48, to permit the escape of the pressure imposing fluid and a return to ambient.

Upon the release of the pressure within the fluid pressure activation compartment 30 which was holding down valve cylinder 56 and thereby closing off the valve inlet closure 34, 50, 52, 60 and 64, the steam pressure generated within the nuclear reactor pressure vessel 14 and carried through its circulating system comprising the steam pipe 16 and condensate water return pipe 18, or the resiliency of the bellows 70 and 72, will force valve cylinder 56 to withdraw away from the valve seat 50. This withdrawal of valve cylinder 56 separates flange disk surface 62 from flange seat surface 54, opening the steam depressurization valve 20, thereby venting the reactor pressure vessel 14 and its entire circulating piping system. Thus any hazardous over-pressurization is relieved and the integrity and safety of the overall system or plant is maintained. Moreover, the steam depressurization valve 20 is effective for releasing normal pressure within the system to terminate leakage of radioactive coolant from the pressurized system.

Since the vented steam and/or water is likely to entrain some radioactive material, the vented fluid is conveyed from the outlet connection 36 of the valve 20 to a suitable location within the confines of the safety containment housing 12, such as a suppression pool 40. The radioactive contaminated steam and/or hot water is thus condensed and cooled by the water or other coolant of the pool enclosed inside the containment housing 12, whereas the valve 20 operating means is outside the containment housing 12.

The unique depressurization valve 20 and its mode of operating of this invention provide for the valve to remain in an open, or steam pressure venting position, throughout receding pressures of depressurization down to substantially ambient gage pressure without the need to maintain any of its actuation means in an energized state.

What is claimed is:

1. In a nuclear reactor plant, an improved steam depressurization valve positioned in a steam discharge pipe for controlling the venting of steam pressure from the reactor through the pipe, said improved depressurization valve consisting essentially of the combination of: a valve housing including a cover forming a chamber and having a partition plate dividing said chamber into a fluid pressure activation compartment and a steam flow control compartment, said valve housing being provided with an inlet connection and an outlet connection in the steam flow control compartment, and a fluid duct in communication with the fluid pressure activation compartment and connected to a source of fluid pressure for operating the valve; a valve seat mounted within the steam flow control compartment surrounding the inlet connection in the housing and a valve cylinder traversing the partition plate and reciprocally movable within an opening in said partition plate with one terminal end extending into the fluid pressure activation compartment and the other terminal end extending into the steam flow control compartment coaxially aligned with the valve seat surrounding the inlet connection thereby providing a reciprocatable valve member for making closing contact with the valve seat and withdrawing therefrom for opening to enable steam flow through the valve.

2. The steam depressurization valve of claim 1, wherein the reciprocatable valve cylinder is provided with guides to inhibit lateral movement and direct the reciprocal movement of the valve cylinder to and away from contact with the valve seat.

3. In a nuclear reactor plant, an improved steam depressurization valve positioned in a steam discharge pipe for controlling the venting of steam pressure from the reactor through the pipe, said improved depressurization valve comprising: a valve housing including a cover forming a chamber and having a partition plate dividing said chamber into a fluid pressure activation compartment and a steam flow control compartment, said valve housing being provided with an inlet connection and an outlet connection in the steam flow control compartment, and a fluid duct in communication with the fluid pressure activation compartment and connected to a source of fluid pressure for operating the valve; a valve seat mounted within the steam flow control compartment surrounding the inlet connection in the housing and a valve cylinder traversing the partition plate and reciprocally movable within an opening in said partition plate with one terminal end extending into the fluid pressure activation compartment and the other terminal end extending into the steam flow control compartment coaxially aligned with the valve seat surrounding the inlet connection thereby providing a reciprocatable valve member for making closing contact with the valve seat and withdrawing therefrom for opening to enable steam flow through the valve, said valve seat surrounding the inlet connection comprises a cylinder section welded to the valve housing at one end and having a radially projecting flange at the other end with a contoured extended valve seating surface.

4. The steam depressurization valve of claim 3, wherein the reciprocally movable valve cylinder is provided at its terminal end adjacent to the valve seat with a radially projecting flange substantially conterminous with the valve seat flange and having a contoured surface facing and complimentary to the contoured valve seating surface whereby the two contoured valve surfaces can meet in a matching relationship.

5. In a nuclear rector plant, an improved steam depressurization valve positioned in a steam discharge pipe for controlling the venting of steam pressure from the reactor through the pipe, said improved depressurization valve comprising: a housing including a cover forming a chamber and having a partition plate dividing said chamber into a fluid pressure activation compartment and a steam flow control compartment, said valve housing being provided with an inlet connection and an outlet connection in the steam flow control compartment, and a fluid duct in communication with the fluid pressure activation compartment and connected to a source of fluid pressure for operating the valve; a valve seat mounted within the steam flow control compartment comprising a cylindrical section surrounding the inlet connection with one end adjoining said connection and having a radially projecting flange at the other end with a contoured extended valve seating surface, and a valve cylinder traversing the partition plate and reciprocally movable within an opening in said partition plate, with one terminal end extending into the fluid pressure activation compartment and the other terminal end extending into the seam flow control compartment coaxially aligned with the valve seat surrounding the inlet connection, said valve cylinder end extending into the steam flow control compartment housing having a radially projecting flange substantially conterminous with the valve seat flange and having a contoured surface facing and complimentary to the contoured valve seating surface whereby the two contoured valve surfaces can meet in matching relationship, thus providing a pressure actuated reciprocatable valve member for making closing contact with the valve seat and withdrawing therefrom for opening steam flow through the valve.

6. The steam depressurization valve of claim 5, wherein the reciprocatable valve cylinder is provided with guides to inhibit lateral movement and direct the reciprocal movement of the valve cylinder to and away from matching contact with the valve seat.

7. The steam depressurization valve of claim 5, wherein the contoured surface of the radially projecting flange of the valve seat is provided with at least one valve sealing member.

8. The steam depressurization valve of claim 5, wherein the reciprocatable valve cylinder is surrounded by two bellow fluid seals.

9. The steam depressurization valve of claim 8, wherein the partition plate is provided with a leak-off duct passing laterally therethrough from adjacent the valve cylinder within the surrounding bellows outward to the exterior of the valve housing.

10. In a nuclear reactor plant, an improved steam depressurization valve positioned intermediate along a steam discharge pipe for controlling the venting of steam pressure from the reactor through the pipe, said improved depressurization valve comprising: a housing including a domed cover forming a chamber and having a partition plate dividing said chamber into a fluid pressure activation compartment and a steam flow control compartment, said valve housing being provided with an inlet connection and an outlet connection in the steam flow control compartment, and a fluid duct in communication with a source of fluid pressure for operating the valve; a valve seat mounted within the fluid flow control compartment comprising a cylindrical section surrounding the inlet connection with one end adjoining said connection and having a radially projecting flange at the other end with a contoured extended valve sealing flange provided with an annular valve sealing member, and a valve cylinder traversing the partition plate and reciprocally movable within an opening in said partition plate with one terminal end extending into the fluid pressure activation compartment and the other terminal end extending into the steam flow control compartment coaxially aligned with the valve seat surrounding the inlet connection, said valve cylinder being surrounded by two bellow fluid seals and provided with guides to inhibit lateral movement, an end of the valve cylinder extending into the fluid flow control compartment having a radially projecting flange substantially conterminous with the valve seat flange and having a contoured surface facing and complimentary to the contoured valve seating surface whereby the two contoured valve surfaces can meet in matching relationship, thus providing a pressure actuated reciprocatable valve member for making closing contact with the valve seat and withdrawing therefrom for opening fluid flow through the valve; said partition plate having a leak-off duct passing laterally therethrough from adjacent the valve cylinder within the surrounding bellow outward to the exterior of the valve housing.

* * * * *